Jan. 23, 1962 H. F. STEEN 3,018,153

STYLUS AND SUPPORT FOR ELECTRIC RECORDERS

Filed Jan. 15, 1959

INVENTOR
HANS F. STEEN
BY John J. Rogan
ATTORNEY

United States Patent Office 3,018,153

Patented Jan. 23, 1962

3,018,153

STYLUS AND SUPPORT FOR ELECTRIC RECORDERS

Hans F. Steen, Jamaica, N.Y., assignor, by mesne assignments, to Litton Systems, Inc., Beverly Hills, Calif., a corporation of Maryland Filed Jan. 15, 1959, Ser. No. 787,076
6 Claims. (Cl. 346—139)

This invention relates to electrical recording apparatus wherein the recording is effected through the intermediary of an electrically energized fine-wire stylus, and is a continuation in part of my prior application Serial No. 615,-175, filed October 10, 1956 (now abandoned).

A principal object of the invention is to provide a fine-wire recording stylus assembly wherein the stylus, except at the actual tip thereof, is provided with a sheath of a special insulation which acts as a vibration damper for inhibiting resonant or other undesired stylus vibrations, which does not carbonize at the relatively high temperatures usually encountered where the recording is effected by an arc or other current discharge between the stylus and the recording blank and which resists the building up of carbon particles at the stylus tip during recording.

A principal object of the invention is to provide a recording stylus and mounting, whereby recordings can be made at high speed without introducing disturbances such as those caused by stylus bounce or by lateral chattering or stylus vibration.

In certain kinds of recorders, for example in facsimile recorders employing a rotatable mounting drum for the recording surface, and a fine-wire recording stylus which is in contact with the recording sheet on the drum, it is extremely important that the point or tip of the stylus be continuously maintained with substantially uniform pressure against the recording sheet. However, the stylus itself must be of extremely light weight and sufficiently rigid to prevent its recording tip changing its angular relation with respect to the rotating drum. Accordingly it is another object of this invention to provide a novel stylus construction and mounting whereby uniform recording pressure is obtained and the stylus is always held in contact with the recording sheet, even though the said sheet possesses substantial surface irregularities.

A feature of the invention relates to a novel recording stylus which is of fine-wire supported for cantilever action at one end, the stylus being bent adjacent its recording tip and provided with a tubular reinforcing sleeve adjacent the bent region and with a specially designed insulation sheath.

Another feature relates to a fine-wire stylus either in the form of a solid flexible wire or a hollow flexible wire carrying a needle point at one end, the wire and stylus being provided with a thin coating of a flexible insulation which is capable of withstanding relatively high temperatures without deterioration and which possesses pronounced anti-sticking qualities for powdered particles such as carbon which may be released from the recording surface.

Another feature relates to a bent wire recording stylus provided with a novel stylus mounting including a slotted guide of magnetic material wherein the stylus rides, the stylus being provided at the region where it rides within the guide and preferably adjacent the recording tip of the stylus, with a reinforcing sleeve magnetizable material and coated with a special insulation. This coated sleeve also cooperates with the magnetic guide to prevent undesirable bouncing or lateral chattering of the stylus during its contact with a movable recording surface.

A still further feature relates to the novel organization, arrangement and relative location and interconnection of parts which cooperate to provide an improved recording stylus arrangement.

Other features and advantages not specifically enumerated will be apparent after consideration of the following detailed descriptions, the appended claims and the attached drawing.

In the drawing, which shows by way of example certain preferred constructions,

Figures 1, 2, 3, 4, 5, 6:
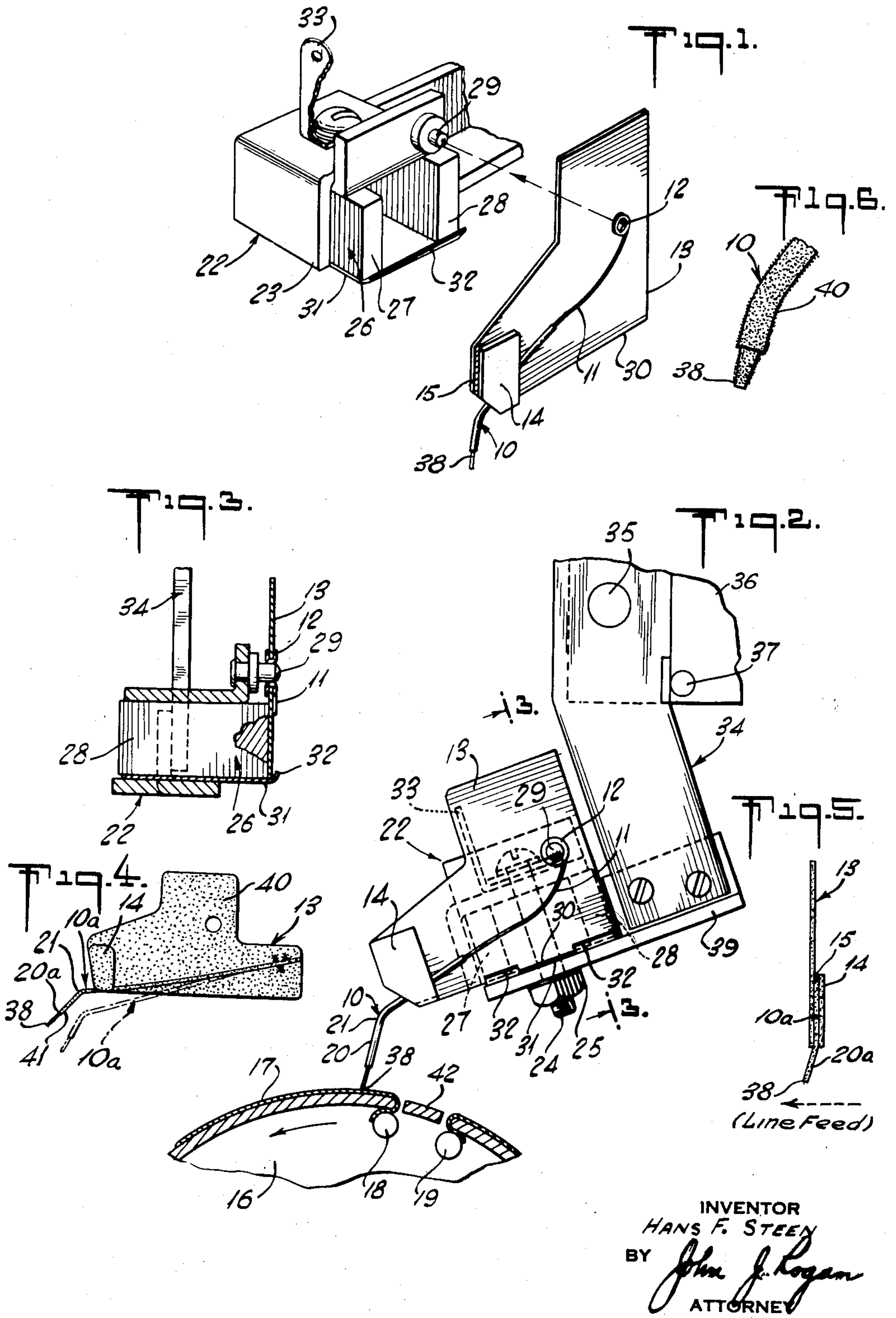
FIG. 1 is an exploded perspective view of a reinforced stylus and replaceable mounting therefor according to the invention.
FIG. 2 is an end view of the stylus and mounting showing the relation of the stylus tip and its reinforced section with respect to a rotatable recording drum.
FIG. 3 is a partial sectional view of FIG. 2 taken along the line 3—3 thereof and viewed in the direction of the arrows.
FIG. 4 is a side view of a modification of the stylus and guide according to the invention.
FIG. 5 is a left hand end view of FIG. 4.
FIG. 6 is a magnified view of part of the stylus.

As is well known, in certain kinds of recorders, for example those of the rotary drum facsimile kind employing a recording stylus, it is the usual practice to clamp the recording sheet on the drum by a clamp bar or the like. Since the recording is effected by passing a recording current through the fine-wire stylus held in contact with the recording sheet, the stylus tends to bounce or chatter. This may be due to the fact that the surface of the recording sheet is not perfectly smooth and also by engagement of the stylus with the sheet clamping bar which passes beneath the stylus during each revolution of the drum. This bouncing and chattering difficulty is more pronounced when the recording is effected at high speeds of the recording drum. For example, the speed of travel of the recording sheet relative to the stylus in practice may be as much as seven or eight feet per second, or even more. This aggravates the tendency of the stylus tip to bounce out of contact with the recording sheet. When such bouncing does occur it produces an undesirable gap in the recorded line, and even very slight up and down movement of the stylus tip or undesirable lateral chatter thereof will result in objectionable variations in the record.

It has been the customary practice heretofore to use a relatively small lightweight stylus. For example a stylus wire of about five to six mils diameter is usually necessary for satisfactory recordings corresponding to line feeds of 100 to 200 lines per inch. It is clear that such a slender and flimsy stylus has a tendency to wobble or waver because of its lack of rigidity, causing a streaky or otherwise objectionable recording. To provide a stylus with the smallest possible mass at its tip or recording end the stylus must be vertically movable to maintain recording contact even with uneven recording surfaces, and yet it must be of sufficiently low inertia to prevent sustained bouncing or chattering. The most satisfactory arrangement, therefore, comprises a short length of strong spring wire such as steel, tungsten, or the like, mounted at one end for cantilever action and with the opposite recording tip end held in contact with the recording surface by the springiness of the stylus wire itself.

It has been proposed heretofore with such a fine-wire stylus to lead the wire through a guide slot usually disposed in a vertical plane to permit the wire to flex in that plane and also to camber the wire against one wall of the guide slot, reliance being placed upon the flexibility of the wire at such cambered region to maintain it in contact with the guide slot wall with sufficient resilient pressure to prevent chattering. I have found that such an arrangement is not entirely satisfactory for high speed recording such as present day high speed facsimile recordings, because the cambered wire is springingly engaged with only one side of the guide slot, and there results from time to time bouncing or even sticking of the wire tip, especially where wires of about 5 to 10 mils cross-sectional diameter are employed. Furthermore, since the guide slot cannot be located at the extreme tip or recording end of the stylus, it is only partially effective for small diameter wire because such wires have substantial lateral flexibility in the region between the stylus tip and the point or region where the wire contacts the guide. The present invention provides a stylus construction and also a stylus mount which overcome the above-noted and other disadvantages.

Referring to the drawing, the stylus is designated generally by the numeral 10. It comprises a fine round wire 11 of steel, tungsten, or similar spring metal, and for example of six mils cross-sectional diameter. The wire 11 is fastened at one end, for example by an eyelet 12 fitted into a suitable opening in the metal plate 13 which should be of magnetic material. The plate 13 has one corner provided with a bent back tongue 14 which defines with the remainder of the plate 13 a vertically disposed stylus guide channel 15. As shown more clearly in FIG. 2, the corner of the bent back portion is cut way at an angle to provide a clear space through which the free end of the wire 11 passes. This free end is bent at an angle so that it is substantially normal to the surface of the rotary drum 16 around which is wrapped the recording sheet 17. The drum 16 can form part of any well known construction of recorder and detailed description thereof is not necessary herein beyond stating that the drum 16 is rotated at the required scanning speed and it may be longitudinally traversed or indexed in any well known manner with respect to the recording stylus. The recording sheet 17 can be clamped to the drum surface by any well known releasable sheet clamping means schematically illustrated by the clamping bars 18, 19.

Telescoped over the wire 11 and extending along the bent region thereof to a point just short of the actual recording tip is a thin-walled metal sleeve 20 of magnetizable material. This reinforcing sleeve 20 is merely long enough and heavy enough to reduce substantially the tendency of the stylus tip to wobble or chatter. The sleeve 20 has an outside diameter substantially less than the width of the guide slot 15. However, the wire 11 is cambered sufficiently so that the sleeve 20 engages one wall of the said guide slot. In accordance with one feature of the invention, the plate 13 is magnetized so that the reinforcing sleeve 20 is held in magnetic contact with the plate 13. This magnetic force exerts a positive damping action against any tendency of the stylus to chatter laterally across the width of the gap of the slot 15. However, sleeve 20 is of sufficiently light weight so that it does not unduly increase the mass of the stylus tip but it does greatly reduce the bouncing and chattering tendencies at high speed recording.

Preferably sleeve 20 is somewhat loosely fitted over the wire 11 and can be fastened to that wire by kinking the sleeve against the wire, for example at the knee 21 of the bend. Thus with a stylus wire 11 of 6 mil diameter the sleeve 20 may have an inside diameter of about 8 mils and an outside diameter of about 16 mils. The slot 15 may have a width of approximately 18 mils.

The magnetic plate 13 which carries the stylus with its reinforcing tip can be quickly detachably supported on a magnetized holder indicated generally by the numeral 22. This holder may comprise a tubular metal member 23 within which is fastened by a suitable bolt 24 and nut 25 a U-shaped permanent magnet 26 whose flat pole faces 27 and 28 are adapted to abut against the magnetic plate 13. The member 22 also carries a locating pin 29 which fits into the eyelet 12 to locate the plate 13 on the holder. Plate 13 can be located in the proper location on the holder by having its lower edge 30 latched by means of a flexible plate 31 carried by member 22, the forward edge 32 of that plate being bent up slightly so as to latch over the edge 30. Electrical connection is made to the stylus by a suitable contact lug 33 carried by member 22.

The above described stylus and holder are insulatingly supported in any suitable manner by being attached to an insulation bracket 34 which can be pivotally mounted, for example at 35, to a main frame 36, and the stylus holder rests against stop 37 in which relation the stylus maintains the proper recording pressure betwen the stylus tip 38 and the recording sheet 17. Preferably the stylus holder assembly 22 is attached to the bracket 34 by a plate 39 of metal or other material.

It will be understood that the stylus with its reinforced tip is not limited to the particular mounting arrangement disclosed. However, the arrangement disclosed has the cooperative advantage that when the reinforcing sleeve 20 is of magnetizable material it is held by magnetic force against the magnetic plate 13, which greatly reduces the tendency of the stylus to chatter or bounce during high speed recording.

I have found that improved results are obtained by providing the stylus, right down to its extreme needle point, with a special high heat resistant insulating resin which is flexible and does not carbonize at high temperatures but which sublimes or decomposes into a gas and which may be applied in a relatively thin layer and as distinguished from ceramic-like coatings. As typical examples of such heat resistant resin may be mentioned tetrafluoroethylene polymer, sold by E. I. du Pont de Nemours and Co., Inc., under the trade name "Teflon," and polychlorotrifluoroethylene, sold by Minnesota Mining and Mfg. Co., under the trade name "Kel–F." Other similar forms of high molecular-weight polymerized resins can be used, so long as they have the desired flexibility, insulation, can be applied in thin coats, and possess great chemical inertness and do not carbonize when subjected to electric arcing. Thus, the entire length of the stylus wire 11, the stainless steel tube 10 and the stylus tip 38 can be provided with a coating of the above described heat resistant resin, as shown in the magnified partial view of FIG. 6. Preferably the metal plate 13 is also provided with a surface coating 40 of a high temperature heat resistant resin, such as that described above, which does not carbonize to form carbon particles and which tends to prevent the accumulation of carbon on the stylus tip. This coating 40 can be of any desired thinness consistent with the desired wearing qualities. For example, it may have a thinness of approximately ½ mil.

While in the embodiment of FIGS. 1–3 the stylus wire is a solid flexible wire carrying a flexible tubing, in the embodiment of FIGS. 4–5 the stylus wire is of hollow flexible metal tubing 20*a*. The stylus tip 38 in the embodiment of FIGS. 4 and 5 is also fitted into the end of the stainless steel tubing 20*a* which may, for example, have an outside diameter of approximately 0.010 inch and an inside diameter of approximately 0.005 inch. The tip 38 may be of tungsten wire, for example of approximately 0.004 inch diameter and tightly fitted into the bent end of tube 20. The tip 38 may be sufficiently long so that it extends partly beyond the bend or knee 21 in the tube 20 so that the tip 38 extends a distance for example of 3/32 of an inch from the open end of tube 20.

In the embodiment of FIG. 4 and FIG. 5, the tube 20*a* of the stylus 10*a* is spot welded to the plate 13, it being understood that the tube 20*a* and the stylus tip 38 are at an appropriate angle with respect to the plate 13 so that after being welded to that plate, and the stylus assembly is mounted on the holder 22, the desired pressure is exerted between the stylus point and the recording blank 17. For example, the tip 38 and the stylus may be at an angle of 30 to 40 degrees with respect to the remaining straight length of the tube 20*a*, and preferably although not necessarily, the tip of the stylus is inclined at a slight angle with respect to the plate 13, as indicated in FIG.

5, and inclined in a direction of the linear feed movement of the blank 17, which is indicated by the dotted arrow in FIG. 5.

It will be understood that the plate 13 is formed with the bent back portion 14 which defines a guide slot 15 for the forward end of the stylus. Preferably the stylus 10, when out of the slot 15, is cambered against the co-operating coated face of plate 13.

I have found that by providing the plate 13, as well as the stylus 10, and including the tip 38, with the high heat resistant resin above mentioned, which resin does not carbonize or leave any solid residue when subjected to extremely high temperature, the build-up of carbon particles at the extreme point of tip 38, is substantially prevented. Such a tendency to build-up carbon particles at the recording point of the stylus would tend to result in non-uniform recordings, for example by changing the effective recording diameter of the stylus point, or by changing the electric and other current conveying characteristics between the stylus point and the blank 17. Primarily such carbon particles are released from the surface of the blank 17 during the electric recording action.

It will be understood that while the entire surface of the tip 38 is initially coated with the above mentioned resin, before the actual recording takes place the extreme point of the tip 38 has the resin removed therefrom, which may take place by the rubbing against the surface of paper 17 during the initial revolution of the drum 16, or the drum may carry a rough surfaced element 42 as disclosed in U.S. Patent No. 2,741,530. Thereafter, of course, the extreme point of the tip 38 is uncoated, enabling recording currents to pass to the blank 17.

In addition to avoiding the undesirable carbon build-up, the coating of the above mentioned resin along the length of the stylus, changes the elastic properties thereof so that the stylus does not oscillate freely as it rides over the clamped edges of the blank 17 or over rough surfaces of the blank. The fact that appreciable damping of the stylus oscillations is achieved is evidenced by the decreased chatter and the speed with which the stylus tip recovers its position on the surface of the paper after having ridden over a rough element.

In addition to the above noted advantages, the coating of the stylus and plate 13 as above mentioned, provides a better bearing surface between the stylus and the stylus guide which greatly reduces the liability of the stylus sticking in the guide. Apparently also, the stylus lasts appreciably longer since it wears away more slowly as a result of the heat of the arc or discharge between the stylus point and the blank 17, and also there is less wear as a result of the abrasive action between the extreme point of the stylus tip and the recording blank.

It will be understood that the plate 13 of FIGS. 4 and 5 is preferably of magnetic material and is carried by a magnetizable support similar to the support 22 of FIG. 1. It will also be understood that the invention is not limited to any particular manner of applying the high temperature resistant insulation to the various parts. For example, the coating with the above noted resins may be done by dipping, spraying, or by any other method known to the art.

Various changes and modifications may be made in the disclosed embodiments without departing from the spirit and scope of the invention. For example, while the special insulating resin coating above described has been shown as applied to two different styli constructions (FIGS. 1–3 and FIGS. 4–5), it will be understood that the said coating may be embodied in any other well known form of flexible stylus which may take the form of a flexible fine-wire, whether solid or hollow, having its recording tip of reduced diameter and carrying the said coating. Accordingly, the term "wire," as used herein, refers either to a solid wire or to a flexible tubular wire.

What is claimed is:

1. A stylus device for electric recorders and the like and through which stylus electric current passes to a recording surface, comprising an elongated flexible stylus member carrying a pointed stylus tip at one end, and means to dampen the tendency of said stylus to freely vibrate when the stylus tip rides over a rough surface, the last mentioned means including a coating of a high temperature resistant resin extending along the length of the stylus, the resin being of a kind which leaves substantially negligible carbon residue when decomposed by the heat at the recording stylus, and which inhibits the build-up of carbon particles on the stylus tip which tends to result from the passage of the recording current from said stylus to said recording surface.

2. A stylus device for electric recorders and the like and through which stylus electric current passes to a recording surface, comprising a flexible fine wire having at least one part of its length formed with a flexible thin walled metal tube, said stylus having a needle pointed tip at one end and being fastened at the other end to a metal support, means to bias said wire against the surface of said support whereby the wire is held in engagement with said support without interfering with its recording vibrations along the surface of said support, and a coating of high heat resistant resin on the said surface of the support and on the surface of the stylus wire which is in contact with said support surface, said resin being substantially free from carbon residue when decomposed by the heat attendant upon said recording current.

3. A stylus device for electric recorders and the like and through which stylus electric current passes to a recording surface, comprising a flexible wire, means anchoring one end of said wire to a stylus support, the opposite end of the stylus being tubular and bent to form a knee, a needle pointed stylus tip fitted into said opposite tubular end, a stylus guide carried by said support and through which said stylus passes, and a coating of high heat resistant insulating resin on said support, said guide and said wire, said resin being of a kind which leaves substantially negligible carbon residue when decomposed by the heat at the recording stylus, and which inhibits the build-up of carbon particles on the stylus tip which tends to result from the passage of the recording current from said stylus to said recording surface.

4. A stylus device according to claim 3 in which said stylus wire is of hollow tubular form, and means are provided for holding said stylus wire in rubbing engagement with said support by magnetic attraction.

5. A stylus device through which recording currents are passed to a recording surface comprising a metal plate, a flexible wire fastened at one end to said plate, said wire terminating in a needle pointed stylus tip and being housed in a tight fitting sleeve, said wire being cambered to bring said wire and sleeve into rubbing contact with said plate, a stylus guide carried by said plate and through which said tubular sleeve and wire extend, and coating of a high heat resistant dielectric resin on said wire and tip which coating has the property of leaving substantially negligible carbon residue when subjected to the normal recording temperatures at the stylus.

6. A stylus device for electric recorders and the like through which recording currents are passed to a recording surface, comprising a wire of springy metal supported for flexure around a supporting point, said wire terminating in a needle pointed tip for completing an electric circuit to a movable recording surface and having a portion of its length bent to form a knee and arranged to flex in a direction normal to said recording surface, and a coating of heat resistant resin insulation on said wire and tip and extending therealong to act as a vibration damper for the stylus during recording, said resin having the property of leaving substantially negligible carbon residue when disintegrated by the normal recording temperatures at the stylus during recording.

References Cited in the file of this patent

UNITED STATES PATENTS 2,599,312 Andres ---------- June 3, 1952
2,733,118 Stamper ---------- Jan. 31, 1956
2,741,530 Hill ---------- Apr. 10, 1956

2,865,795 Morrison ---------- Dec. 23, 1958
2,867,491 Nelson ---------- Jan. 6, 1959

OTHER REFERENCES

N. R. L. Report 4753, "Thin Films of Polytetrafluorethylene Resin (Teflon) as Lubricants and Preservative Coatings for Metals," June 15, 1956.